March 1, 1927.

C. H. DESAUTELS 1,619,102

BEAD MOLD

Filed March 23, 1925

INVENTOR.
Charles H. Desautels
BY
Edward C. Taylor
ATTORNEY.

Patented Mar. 1, 1927.

1,619,102

UNITED STATES PATENT OFFICE.

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

BEAD MOLD.

Application filed March 23, 1925. Serial No. 17,487.

This invention relates to a mold adapted for the vulcanization of annular articles such as bead fillers for tire casings. The object with which the mold has been produced is the simultaneous stretching and shaping of the article, particularly in subjecting the bead fillers of pneumatic tires to a cold pressing operation prior to their incorporation into the tire. To this end the mold has been constructed in two parts, together forming an annular molding enclosure for the article. That one of the mold halves which bears against the inner circumference of the article is provided with movable sections, operable by the same pressure used in closing the mold, which stretch the ring to its proper diameter during molding, and withdraw after the molding is completed to permit the replacement of the finished article by a fresh one.

Referring to the drawings.

Figure 1:
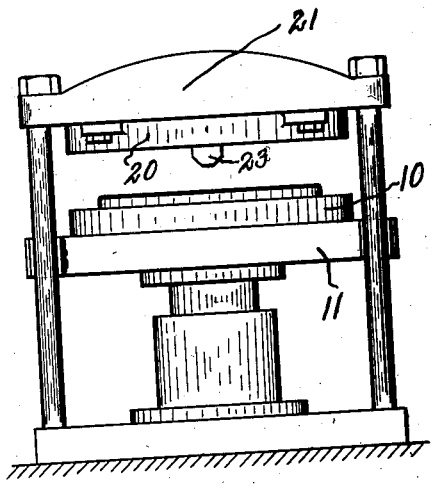
Fig. 1 is a side elevation of a press showing the manner in which my improved mold operates.

The lower half of the mold is formed from a circular member 10, which in use is permanently secured to the lower platen 11 of any suitable power press, and a pair of sections 12 movable radially in guideways 13 formed in the fixed section. All sections are provided with a shouldered molding portion 14 which, when the movable portions are extended outwardly, forms a continuous molding surface for two sides of the triangular bead filler 15. Attached to the lower side of each movable section 12 is a pin 16, against which bears a compression spring 17 seated in a recess in the main part 10 of the lower mold half. At their inner edges the movable sections also carry rollers 18 pivoted on transverse shafts 19 for a purpose to appear.

The upper mold half 20 is fixed to the upper platen 21 of the press and is of unitary construction, a depending flange 22 being beveled at its inner edge to cooperate with shouldered portion 14 of the lower mold half in forming an annular molding cavity. At the center of the upper mold half is fixed a member having a lower wedge portion 23 and an upper straight portion 24 and adapted to enter between the two rollers 18. If desired, tapered dowels 25 on one half may be supplied, fitting into tapered holes 26 in the other half.

Figure 2:
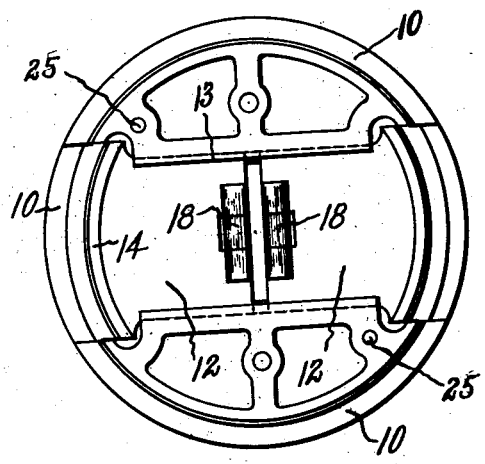
Fig. 2 is a top plan view of the lower half of the mold.
Figure 4:
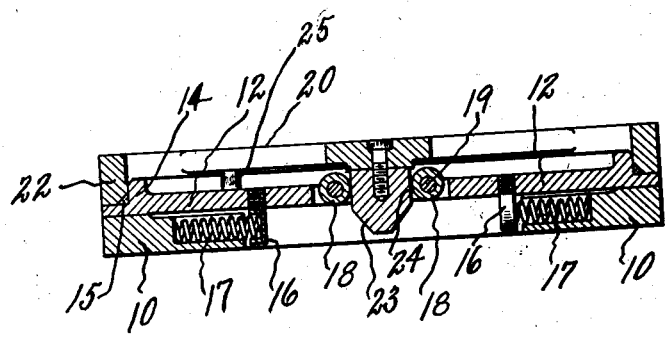
Fig. 4 is a transverse section through the assembled mold when engaged in molding a bead filler.
Figure 3:
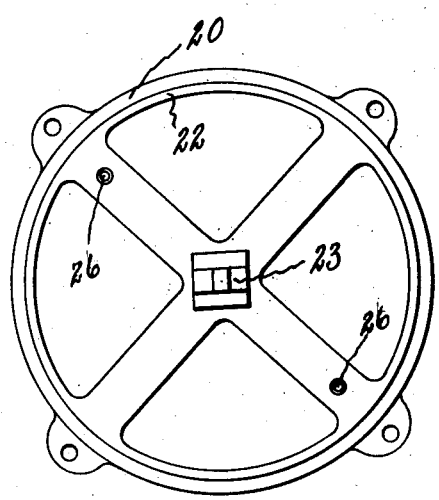
Fig. 3 is a bottom plan view of the upper half of the mold.
Figure 5:
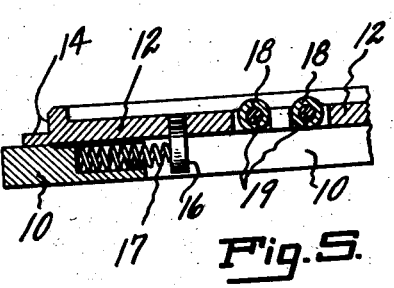
Fig. 5 is a fragmentary view, similar to Fig. 4 but showing the lower half of the mold after the removal of the upper half.

The condition of the lower mold half before a bead filler is put in place for molding is illustrated in Figs. 2 and 5. It will be noted that springs 17 have forced the slides 12 inwardly so that shouldered portion 14 is out of line with the similar structure on the rest of this mold half. This reduces the circumference of the mold sufficiently to permit a bead filler—a wire ring or grommet with a covering of rubberized fabric—to be applied over the outer circumference of the shoulder. With the unshaped bead filler in place the press is caused to close, performing two functions during the closure. As the upper mold half nears the lower half the wedge 23 enters between rollers 18, forcing the slides 12 steadily outwardly until shoulders 14 on the slides are in line with the shoulders on the stationary part of the mold. When this position has been reached the rollers have run onto the straight part 24 of the wedge, whereby the slides 12 are held in fixed extended position during the remainder of the pressing operation. Further closing of the mold halves results in pressure being exerted on the bead filler within the triangular molding cavity, shaping the bead to the form desired.

It will be seen from the description above that my improved mold both expands the bead filler to size and shapes it to the cross-sectional form desired, also decreasing in size automatically upon cessation of the pressure to permit the removal of the shaped bead and its replacement by a fresh one without the distortion of the bead incident to prying it off from a mold of fixed circumference.

Having thus described my invention, I claim:

A mold for pressing triangular tire bead fillers which comprises a disk having segmental shouldered portions defining parts of two walls of an annular molding cavity, members radially slidable on the disk and having segmental shouldered portions forming continuations of the shouldered portions of the disk when the members are radially extended, springs for holding the members normally radially retracted, an annulus forming the third wall of the molding cavity, and wedge means secured to the annulus and adapted to extend between the members to force them apart, whereby when the annulus and the disk are pressed axially together the members will be radially extended to form with the shouldered portions of the disk a continuous molding surface and when the annulus and the disk are separated the members will be radially retracted to permit the removal of a molded bead filler.

CHARLES H. DESAUTELS.